United States Patent
Ito

(10) Patent No.: US 11,498,457 B2
(45) Date of Patent: Nov. 15, 2022

(54) VEHICLE MOUNTED SYSTEM, VEHICLE CONTROL SYSTEM AND METHOD FOR MONITORING AN INFANT IN A VEHICLE CABIN

(71) Applicant: DENSO CORPORATION, Kariya (JP)

(72) Inventor: Masahiko Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 111 days.

(21) Appl. No.: 17/071,894

(22) Filed: Oct. 15, 2020

(65) Prior Publication Data

US 2021/0114485 A1 Apr. 22, 2021

(30) Foreign Application Priority Data

Oct. 18, 2019 (JP) .............................. JP2019-191465

(51) Int. Cl.
*G08B 21/00* (2006.01)
*B60N 2/00* (2006.01)
*B60N 2/26* (2006.01)
*G08B 21/24* (2006.01)
*G06V 20/59* (2022.01)

(52) U.S. Cl.
CPC .............. *B60N 2/002* (2013.01); *B60N 2/26* (2013.01); *G06V 20/593* (2022.01); *G08B 21/24* (2013.01)

(58) Field of Classification Search
CPC ........ B60N 2/002; B60N 2/26; G06V 20/593; G06V 20/00; G06V 40/20; G08B 21/24
USPC ...................................................... 340/573.1
See application file for complete search history.

(56) References Cited

U.S. PATENT DOCUMENTS

| | | | |
|---|---|---|---|
| 2009/0234542 A1* | 9/2009 | Orlewski | G08B 21/22 701/45 |
| 2009/0261979 A1* | 10/2009 | Breed | G01S 15/88 340/576 |
| 2015/0165932 A1* | 6/2015 | Maley | G08B 21/24 340/457 |
| 2016/0144781 A1* | 5/2016 | Kleinert | B60Q 9/00 701/36 |
| 2017/0001560 A1* | 1/2017 | Roisen | G08B 21/0266 |
| 2017/0190287 A1* | 7/2017 | Gjoni | B60N 2/002 |
| 2017/0225624 A1* | 8/2017 | Fischer | B60R 11/02 |
| 2018/0285635 A1 | 10/2018 | Arata et al. | |

FOREIGN PATENT DOCUMENTS

| | | |
|---|---|---|
| FR | 3 048 110 A1 | 8/2017 |
| JP | 2000185609 A | 7/2000 |
| JP | 2013129231 A | 7/2013 |

\* cited by examiner

*Primary Examiner* — Mark S Rushing
(74) *Attorney, Agent, or Firm* — Maschoff Brennan

(57) ABSTRACT

A vehicle control system monitors an infant possibly left behind in a cabin of a vehicle. The vehicle control system performs a danger avoidance process of either avoiding or reducing a danger to the infant based on a monitoring result. The vehicle control system includes an image acquirer for acquiring one or more vehicle stationary images indicating an interior of the cabin. The one or more vehicle stationary images are captured by an imaging device during stopping of the vehicle. A leaving behind determiner is provided to determine presence or absence of an infant left behind in the cabin based one or more vehicle stationary images.

7 Claims, 9 Drawing Sheets

FIG.5
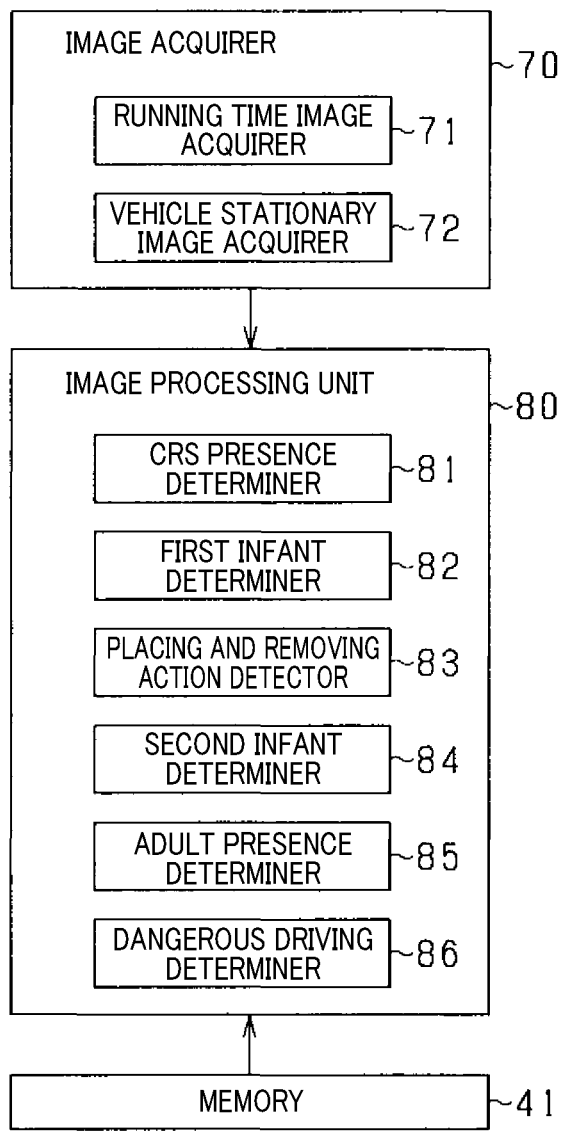
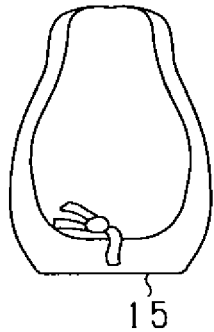
FIG.6A
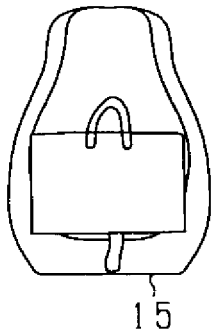
FIG.6B
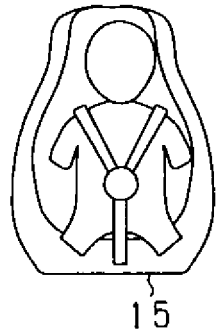
FIG.6C

VEHICLE MOUNTED SYSTEM, VEHICLE CONTROL SYSTEM AND METHOD FOR MONITORING AN INFANT IN A VEHICLE CABIN

CROSS-REFERENCE TO RELATED APPLICATION

This patent application is based on and claims priority to Japanese Patent Application No. 2019-191465, filed on Oct. 18, 2019 in the Japan Patent Office, the entire disclosure of which is hereby incorporated by reference herein.

BACKGROUND

Technical Field

The present disclosure relates to a vehicle mounted system, a vehicle control system and a vehicle control method.

Related Art

A conventional device monitors an infant in a cabin and notifies a driver that the infant is left behind therein when the infant is left behind in the cabin.

However, because the conventional device determines presence of an infant left behind in the cabin based on detection of opening and closing of a rear door, it will be erroneously determined in a situation in which an infant enters via the rear door and exits from a front door that the infant is left-behind even if no infant is actually left behind in the cabin.

SUMMARY

The present disclosure is made to address the above-described problem, and it is an object thereof to provide a vehicle control system capable of determining presence of an infant left behind in a cabin after confirming presence of the infant therein.

Accordingly, one aspect of the present disclosure provides a novel vehicle mounted system that includes an imaging device to capture one or more vehicle stationary images indicating an interior of a cabin and a vehicle control system to monitor an infant possibly left behind in a cabin of a vehicle and perform a danger avoidance process of either avoiding or reducing a danger to the infant based on a monitoring result. The vehicle control system includes: an image acquirer to acquire the one or more vehicle stationary images from the imaging device, and a leaving behind determiner to determine whether the infant is left behind in the cabin based on the one or more vehicle stationary images.

Another aspect of the present disclosure provides a novel vehicle control system for monitoring an infant possibly left behind in a cabin of a vehicle and performing a danger avoidance process of either avoiding or reducing a danger to the infant based on a monitoring result. The vehicle control system includes: an image acquirer for acquiring one or more vehicle stationary images indicating an interior of the cabin, the vehicle stationary image captured by an imaging device, and a leaving behind determiner for determining whether the infant is left behind in the cabin based on) the one or more vehicle stationary images.

Yet another aspect of the present disclosure provides a novel method of monitoring an infant possibly left behind in a cabin of a vehicle. The method includes the steps of: capturing vehicle stationary images of an interior of the cabin; acquiring one or more vehicle stationary images; and determining whether a child seat is present in the cabin based on the one or more vehicle stationary image. The method further includes the steps of: detecting actions taken by a driver or an occupant when an infant is placed on and removed from the child seat based on the one or more vehicle stationary images if it is determined that the child seat is present in the cabin; determining whether the infant is left behind in the cabin based on the one or more vehicle stationary images; and determining that the infant is left behind on the child seat when an action of placing the infant on the child seat is detected but an action of removing the infant from the child seat is not detected subsequently. The method further includes the step of performing a danger avoidance process of either avoiding or reducing a danger to the infant based on the determination of whether the infant is left behind in the cabin.

Hence, according to these aspects of the present disclosure, a vehicle stationary image as an image of an interior of a cabin is acquired by using an imaging device during a stop of running of a vehicle and determines presence of an infant left behind in the cabin based on the vehicle stationary image. Specifically, by using the image captured when a vehicle is stationary in determining the presence of the infant left behind, the infant included in the image captured when a vehicle is stationary can be identified, for example, by using an image extraction process and/or a face recognition process. As a result, the infant can be determined to be left behind in the cabin after the presence of the infant has been confirmed.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 5 is a block diagram illustrating an exemplary configuration of a vehicle control system employed in the first embodiment of the present disclosure;

FIGS. 6A to 6C are diagrams illustrating various conditions of a child seat employed in the first embodiment of the present disclosure;

DETAILED DESCRIPTION

A conventional device monitors an infant in a cabin and notifies a driver that the infant is left behind therein when the infant is left behind in the cabin as discussed, for example, in Japanese Patent Application Laid Open NO. 2013-129231 (JP-2013-129231-A)). In such a conventional device, it is determined that an infant or the like has entered through a rear door on condition that opening and closing of the rear door is detected when an occupant gets into a vehicle. Subsequently, if opening and closing of the rear door is not detected again, it is determined that the infant or the like has not exited a vehicle and is left behind in the cabin. With this, a risk of leaving the infant behind in the cabin can be either avoided or reduced.

However, because the conventional device determines presence of an infant left behind in the cabin based on a detection of the opening and closing of the rear door, it will be erroneously determined in a situation in which an infant enters via the rear door and exits from a front door that the infant is left-behind even if no infant is actually left behind in the cabin.

In view of this, to suppress this type of error, a technology capable of directly confirming presence of an infant in the cabin is expected to accurately determine occurrence of such an event.

Figure 1:
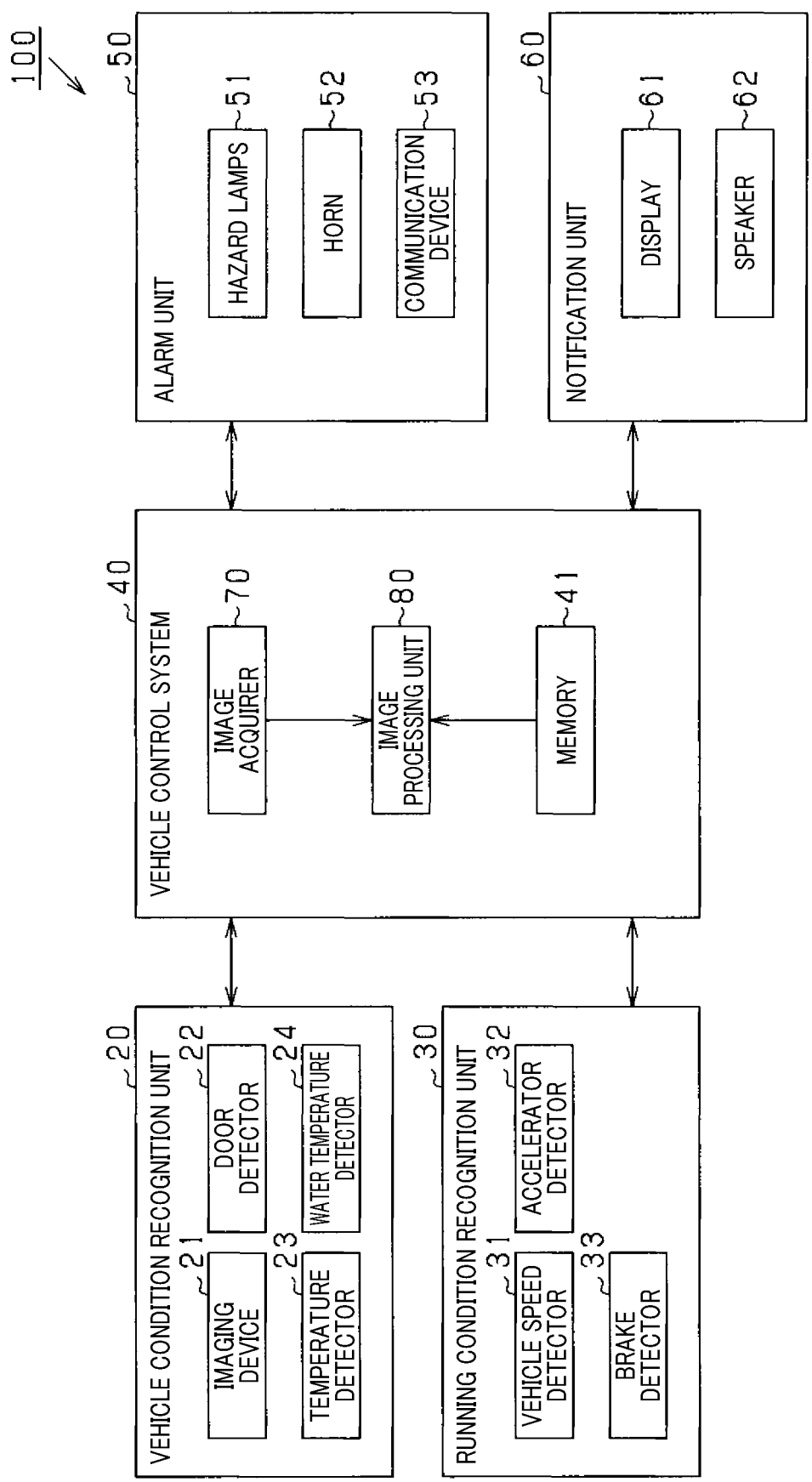
FIG. 1 is a block diagram illustrating an exemplary configuration of a vehicle-mounted system according to a first embodiment of the present disclosure.

Referring now to the drawings, wherein like reference numerals designate identical or corresponding parts throughout the several views thereof, and to FIG. 1, an exemplary configuration of a vehicle-mounted system 100 employed in the first embodiment of the present disclosure is illustrated. Specifically, the vehicle-mounted system 100 includes a vehicle condition recognition unit 20, a running status recognition unit 30 and a vehicle control system 40. The vehicle-mounted system 100 also includes an alarm unit 50 and a notification unit 60. In short, the vehicle control system 40 monitors an infant possibly left behind in a cabin based on information transmitted from each of the recognition units 20 and 30, and notifies the alarm unit 50 to the effect that the infant is left behind therein when the infant is left behind therein.

Figure 2:
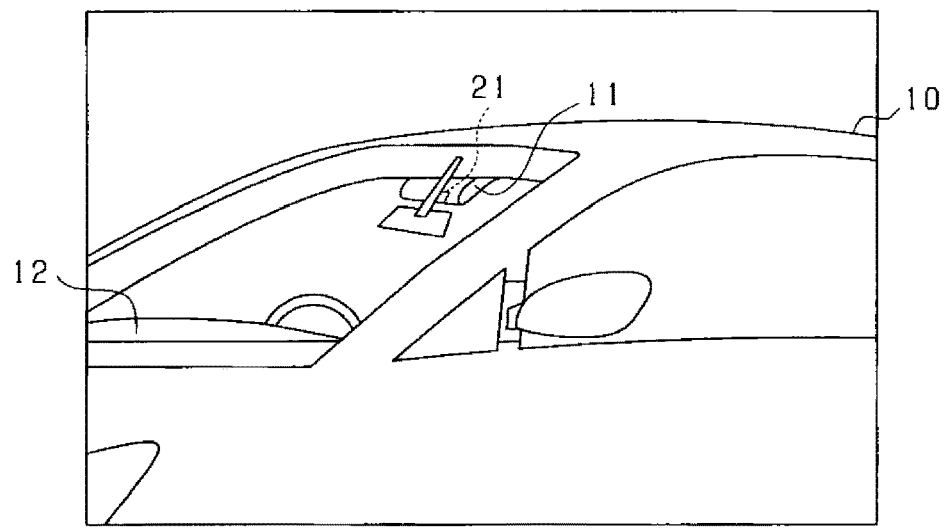
FIG. 2 is a diagram illustrating an exemplary mounting location on a vehicle, at which an imaging device is mounted according to the first embodiment of the present disclosure.

The vehicle condition recognition unit 20 includes an imaging device 21, a door detector 22 and a temperature detector 23. The vehicle condition recognition unit 20 also includes a water temperature detector 24. The imaging device 21 is, for example, composed of a CCD (Charge-Coupled Device) camera and captures images of an interior of the vehicle by using a lighting device, such as a near infrared LED (Light-Emitting Diode), etc. As illustrated in FIG. 2, the imaging device 21 is mounted substantially on a center of an overhead console 11 in the vehicle 10 while facing a driver's seat and an assistant driver's seat. However, instead of the overhead console 11, the imaging device 21 can be disposed on an instrument panel 12 or in a steering column. The imaging device 21 can also be attached to a lower end of a rear-view mirror.

Figure 3:
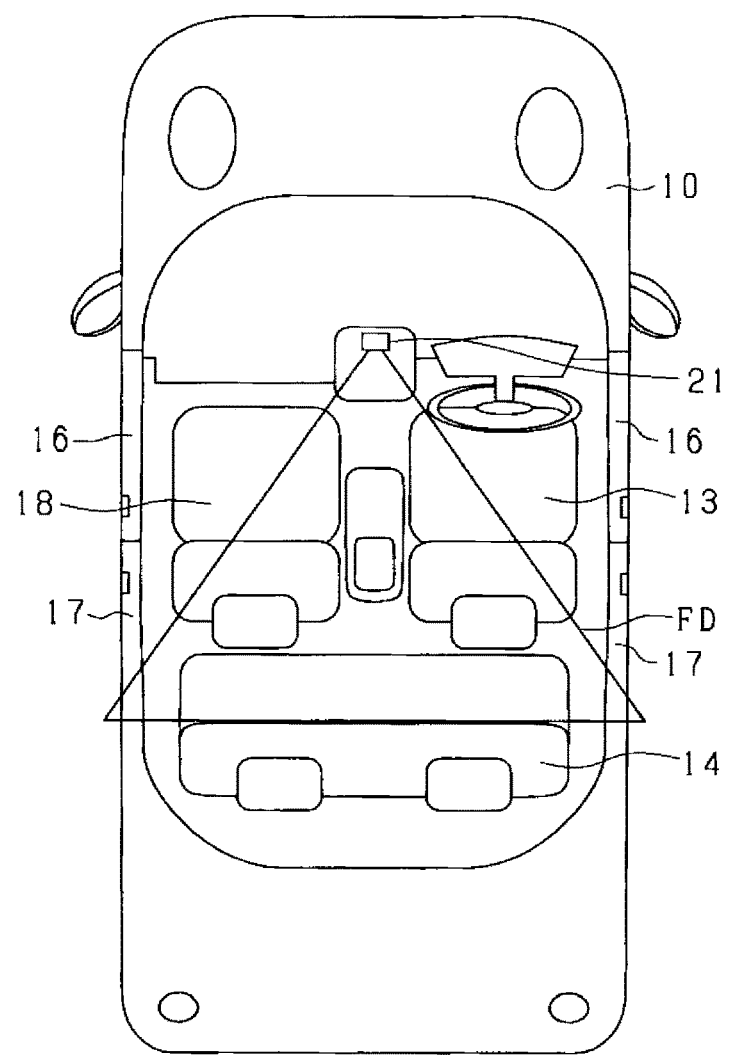
FIG. 3 is a diagram illustrating an imaging range in which the imaging device can image an object according to the first embodiment of the present disclosure.
Figure 4:
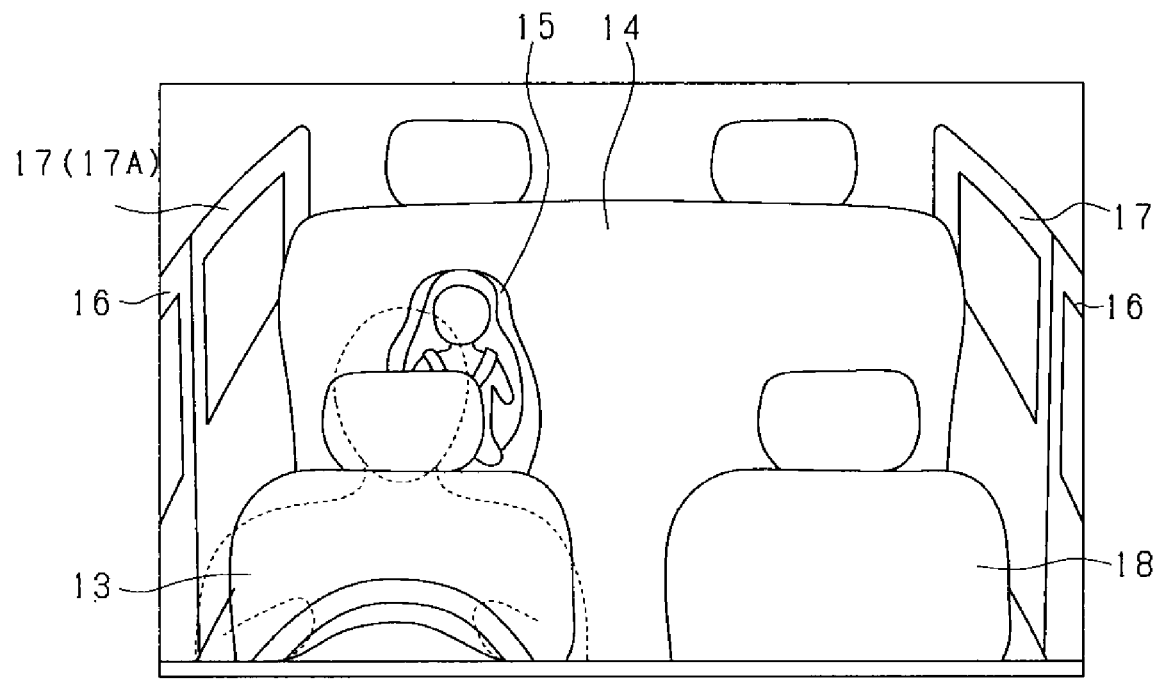
FIG. 4 is a diagram illustrating an example of an image of a vehicle interior, captured by the imaging device when a vehicle is stationary according to the first embodiment of the present disclosure.

Further, as illustrated in FIGS. 3 and 4, an imaging range FD of the imaging device 21 includes the driver's seat 13. Hence, by using the imaging device 21, an upper body of the driver seated in the driver's seat can be captured from a front side of him or her (see a broken line illustrated in FIG. 4). Further, the imaging range FD of the imaging device 21 also includes rear seats 14. Hence, an infant seated in a child seat (hereinafter simply referred to as a CRS) 15 mounted on the rear seat 14 can be imaged by the imaging device 21.

Further, the imaging range FD of the imaging device 21 extends only to the rear doors 17 of the vehicle 10, and does not extend to the front doors 16 thereof. Hence, the imaging device 21 can image actions of an occupant when he or she places the infant on and removes the infant from the CRS 15 (see FIG. 7) through specific doors (i.e., rear doors) 17 near a seat on which the CRS 15 is mounted among the vehicle doors 16 and 17. Accordingly, this embodiment is described herein below based on a situation in which an infant is placed on and removed from the CRS 15 via the door 17A near the seat on which the CRS 15 is mounted among the specific doors 17.

Further, the door detector 22 is a detector for detecting opening and closing of each of the vehicle doors 16 and 17 attached to the vehicle 10. More specifically, the door detectors 22 detect opening and closing of the vehicle doors 16 and 17 of the vehicle 10, respectively. The temperature detector 23 is a detector for detecting vehicle cabin room temperature YM. The water temperature detector 24 is a detector for detecting temperature of cooling water cooling an engine of the vehicle.

Further, the running status recognition unit 30 includes a vehicle speed detector 31, an accelerator detector 32 and a brake detector 33. The vehicle speed detector 31 is a detector for detecting a vehicle speed VM. The accelerator detector 32 is a detector for detecting an accelerator (throttle) opening degree (i.e., an amount of operation of an accelerator pedal. The brake detector 33 is a detector for detecting an amount of operation of a brake pedal.

Further, the vehicle control system 40 is constituted by a microcomputer. The microcomputer includes a CPU (Central Processing Unit), a ROM (Read Only Memory) and a RAM (Random Access Memory). The microcomputer also includes an I/O (Input/Output port). The microcomputer obtains various information from the vehicle condition recognition unit 20 and the running status recognition unit 30. The vehicle control system 40 and each of the recognition units 20 and 30 are connected to each other via either wired communication such as a CAN (Controller Area Network), etc., or wireless communication, such as a LAN (Local Area Network), Bluetooth (registered trademark), etc. The vehicle control system 40 achieves functions of the image acquirer 70 and the image processing unit 80 to determine whether an infant is left behind in a cabin when a CPU runs various programs stored in the ROM.

Now, the various functions achieved by the vehicle control system 40 will be herein blow described more in detail with reference to FIG. 5. Specifically, the image acquirer 70 includes a running time image acquirer 71 and a vehicle stationary image acquirer 72.

Specifically, the running time image acquirer 71 acquires a running time image GR captured by the imaging device 21 when a vehicle is running. More specifically, when it is determined based on various information acquired from the running status recognition unit 30 that the vehicle is running, the running time image acquirer 71 performs a first acquisition process to acquire the running time image GR in a first cycle by controlling the imaging device 21.

Further, the vehicle stationary image acquirer 72 acquires a vehicle stationary image GS captured by the imaging device 21 during stop of running of a vehicle 10. More specifically, when it is determined based on various information acquired from the running status recognition unit 30 that the vehicle 10 stops running, the vehicle stationary image acquirer 72 performs a second acquisition process for acquiring the image GS in a second cycle by controlling the imaging device 21.

That is, the image acquirer 70 selectively performs one of the first acquisition process and the second acquisition process in accordance with a running condition of the vehicle 10 (i.e., running time or stopping time) by switching a process between the first acquisition process and the second acquisition process. In this embodiment, the first cycle and the second cycle are different from each other. For example, the first cycle is shorter than the second cycle.

Further, the image processing unit 80 performs each of processes of CRS presence determination, first infant presence determination and detection of placing and removing actions based on various images acquired by the image acquirer 70. The image processing unit 80 also performs second infant presence determination, adult presence determination and dangerous driving state determination based on the various images. Further, the image processing unit 80 includes a CRS presence determiner 81 for performing each of the processes, a first infant determiner 82 and a placing and removing action detector 83. The image processing unit 80 also includes a second infant determiner 84, an adult presence determiner 85 and a dangerous driving state determiner 86. These devices are hereinbelow described more in detail in order.

First, it is determined whether a CRS is present in a manner as described herein below. Specifically, based on the vehicle stationary image GS, the CRS presence determiner 81 determines presence or absence of the CRS 15 in the cabin. Specifically, in a memory 41, various information used in various devices are stored. The CRS presence determiner 81 then determines whether at least a portion of a reference image of the CRS 15 stored in the memory 41 is included in the vehicle stationary image GS. When the vehicle stationary image GS includes at least the portion of the reference image of the CRS 15, the CRS presence determiner 81 determines that the CRS 15 is present in the cabin. By contrast, when the vehicle stationary image GS does not include at least the portion of the reference image of the CRS 15, the CRS presence determiner 81 determines that the CRS 15 is absent in the cabin.

Secondly, a first infant determination process of determining whether an infant is present is performed in a manner as described hereinbelow. Specifically, when it is determined by the CRS presence determiner 81 that the CRS 15 is present in the cabin, the first infant determiner 82 determines presence or absence of an infant left behind on the CRS 15 based on the vehicle stationary image GS. Specifically, the first infant determiner 82 determines whether an infant or a luggage (hereinafter referred to as an infant or the like) is present on the CRS 15. Then, when the infant or the like is present on the CRS 15, the first infant determiner 82 determines whether the infant or the like is an infant. Such determination of whether the infant or the like is the infant is performed, for example, by using a face recognition process based on face recognition data stored in the memory 41.

Further, the first infant determiner 82 determines that the infant is not left behind on the CRS 15, for example, when either an infant or the like is absent on the CRS 15 as illustrated in FIG. 6A or the infant or the like is present on the CRS 15 but the infant or the like is actually a luggage as illustrated in FIG. 6B. By contrast, as illustrated in FIG. 6C, when the infant or the like is present on the CRS 15 and the infant or the like is actually an infant, the first infant determiner 82 determines that the infant is left behind on the CRS 15 (i.e., in the cabin).

Thirdly, actions of placing and removing an infant is detected in a manner as described herein below. Specifically, when the CRS presence determiner 81 determines that the CRS 15 is present in the cabin, the placing and removing action detector 83 detects actions taken when the infant is placed on and removed from the CRS 15 based on the vehicle stationary image GS. More specifically, the placing and removing action detector 83 detects actions taken when the infant is placed on the CRS 15 and removed therefrom based on multiple vehicle stationary images GS acquired during a door opening period HP when a specific door 17 closest to a seat on which the CRS 15 is mounted is open. Here, the door opening period HP of the specific door 17 is calculated based on opening and closing information of the specific door 17 acquired from the door detector 22.

Figure 7A:
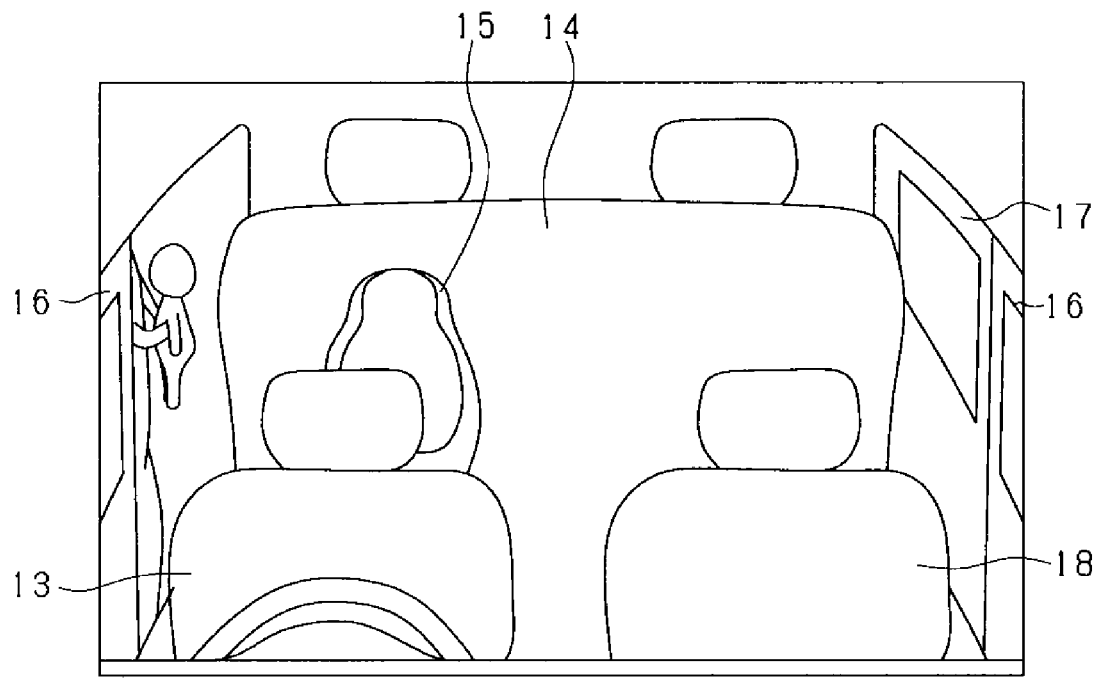
FIGS. 7A and 7B are diagrams collectively illustrating an action of a driver or an occupant taken when he or she places an infant on and removes the infant from the child seat according to the first embodiment of the present disclosure.
Figure 7B:
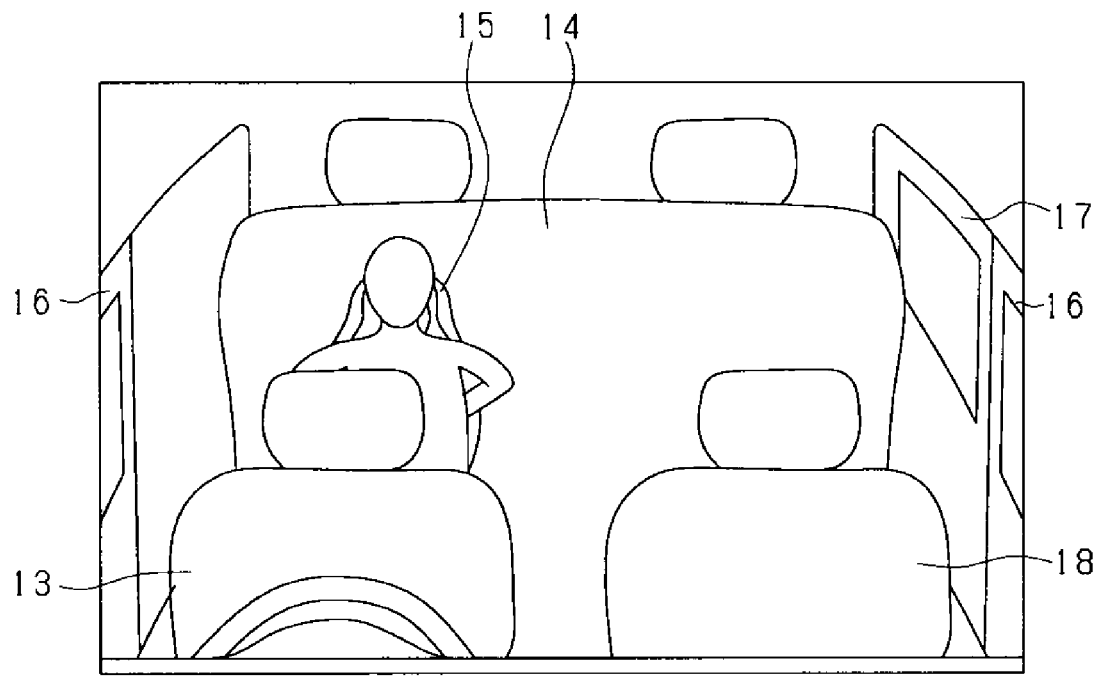

Specifically, the placing and removing action detector 83 selects a first vehicle stationary image GS1 captured immediately after the specific door 17 is open and a second vehicle stationary image GS2 captured immediately before the specific door 17 is closed from the multiple vehicle stationary images GS acquired during the door opening period HP. For example, as illustrated in FIG. 7A, the first vehicle stationary image GS1 can be an image that indicates a situation where an adult is lifting an infant in the vicinity of the specific door 17, and as illustrated in FIG. 7B, the second vehicle stationary image GS2 can be an image that indicates a situation where the adult is either attaching or detaching a belt of the CRS 15 thereto or therefrom in the vicinity of the CRS 15. In such a situation, the placing and removing action detector 83 detects (i.e., recognizes) an action of placing the infant on the CRS 15 as an action continued from when the first vehicle stationary image GS1 is imaged to when the second vehicle stationary image GS2 is imaged based on these images GS1 and GS2.

By contrast, when FIGS. 7B and 7A correspond to the first vehicle stationary image GS1 and the second vehicle stationary image GS2, respectively, the placing and removing action detector 83 detects (i.e., recognizes) an action of removing the infant from the CRS 15 based on the first vehicle stationary image GS1 and the second vehicle stationary image GS2.

Fourthly, the second infant determination process is performed in a manner as herein below described. Specifically, the second infant determiner 84 determines whether an infant is left behind on the CRS 15 during the stop of running of the vehicle 10 based on a detection result generated by the placing and removing action detector 83. Specifically, The second infant determiner 84 determines that the infant is not left behind on the CRS 15 either when the placing and removing action detector 83 does not detects an action of placing the infant on the CRS 15 or when the placing and removing action detector 83 detects both of actions of placing and removing the infant on and from the CRS 15. By contrast, the second infant determiner 84 determines that the infant is left behind on the CRS 15 in the cabin when the placing and removing action detector 83 detects an action of placing the infant on the CRS 15 and does not detect an action of removing the infant from the CRS 15.

Fifthly, adult determination is performed in a manner as described herein below in detail. Specifically, the adult presence determiner 85 determines whether an adult is present in the cabin based on the vehicle stationary image GS. More specifically, the adult presence determiner 85 determines whether an occupant is present in one of the driver's seat 13, the driver's assistant seat 18 (see FIGS. 3 and 4) and the rear seats 14. Then, when the occupant is present, the adult presence determiner 85 determines whether the occupant is an adult. Here, it is determined whether the occupant is the adult, for example, based on a shoulder width of the occupant determined by a physique determination process performed based on physique determination data stored in the memory 41.

Sixthly, the dangerous driving state determination is performed in a manner as described below. Specifically, the dangerous driving state determiner 86 determines a dangerous driving state of a driver during running of a vehicle based on the running time image GR. Here, the dangerous driving state includes, for example, a dozing condition of the driver. The dangerous driving state determiner 86 determines that the driver is in the dangerous driving state, for example, when a head of the driver in the running time image GR continuously deviates from a reference range of the running time image GR for a time period more than a reference period. Here, the reference range is a range from which a head of a driver does not deviate in normal operation. More specifically, the reference range is a range from which the head of the driver does not deviate in the normal operation even when the driver picks up something in the vehicle.

Further, the vehicle control system 40 performs an alarm process (i.e., a danger avoidance process) for outputting an alarm instruction to the alarm unit 50 when the first the second infant determiners 82 and 84 collectively determines that the infant is left behind in the cabin. Hence, the alarm unit 50 includes hazard lamps 51, a horn 52 and a communication device 53. The hazard lamps 51 are indicators provided on front and rear sides of the vehicle 10, respectively, and simultaneously serve as blinkers (i.e., direction indicators). The horn 52 is a device disposed in the vehicle 10. The communication device 53 is a device capable of communicating with a portable information terminal (e.g., smartphone) carried by the driver via a communication line, such as Internet, etc.

More specifically, the vehicle control system 40 evaluates a level of a risk to an infant left behind in the cabin, for example, by three stages based on information of vehicle cabin room temperature YM obtained from the temperature detector 23, and outputs an alert instruction indicating one of the three stages in accordance with the level of the risk as evaluated. For example, at a first level safest for an infant, the vehicle control system 40 controls the hazard lamps 51 to blink and the horn 52 to blow relatively in a long cycle. At a second level with a risk higher than the first level, flashing of the hazard lamps 51 and blowing of the horn 52 are performed relatively in a short cycle. Further, at a third level most dangerous for an infant, the vehicle control system 40 notifies the portable information terminal of the driver of an event in that the infant is left behind in the cabin via the communication device 53 in addition to blowing of the horn 52 and flashing of the hazard lamps 51.

Further, the vehicle control system 40 performs a notification process for outputting a notification instruction to the notification unit 60 when it is determined by the dangerous driving state determiner 86 that a driver is in a dangerous driving state. Hence, the notification unit 60 includes a display 61 and a speaker 62. The display 61 is composed of a display used in a vehicle navigation device or a vehicle-mounted display disposed on a meter panel. The speaker 62 is composed of an in-vehicle speaker shared with the vehicle navigation device or an audio device and the like. Hence, the vehicle control system 40 prompts a driver to recover a normal driving condition if it is determined by the dangerous driving state determiner 86 that the driver is in the dangerous driving state. Here, the vehicle control system 40 can control the vehicle 10 to either slow down or stop running if it is determined by the dangerous driving state determiner 86 that the driver is in the dangerous driving state.

Figure 8:
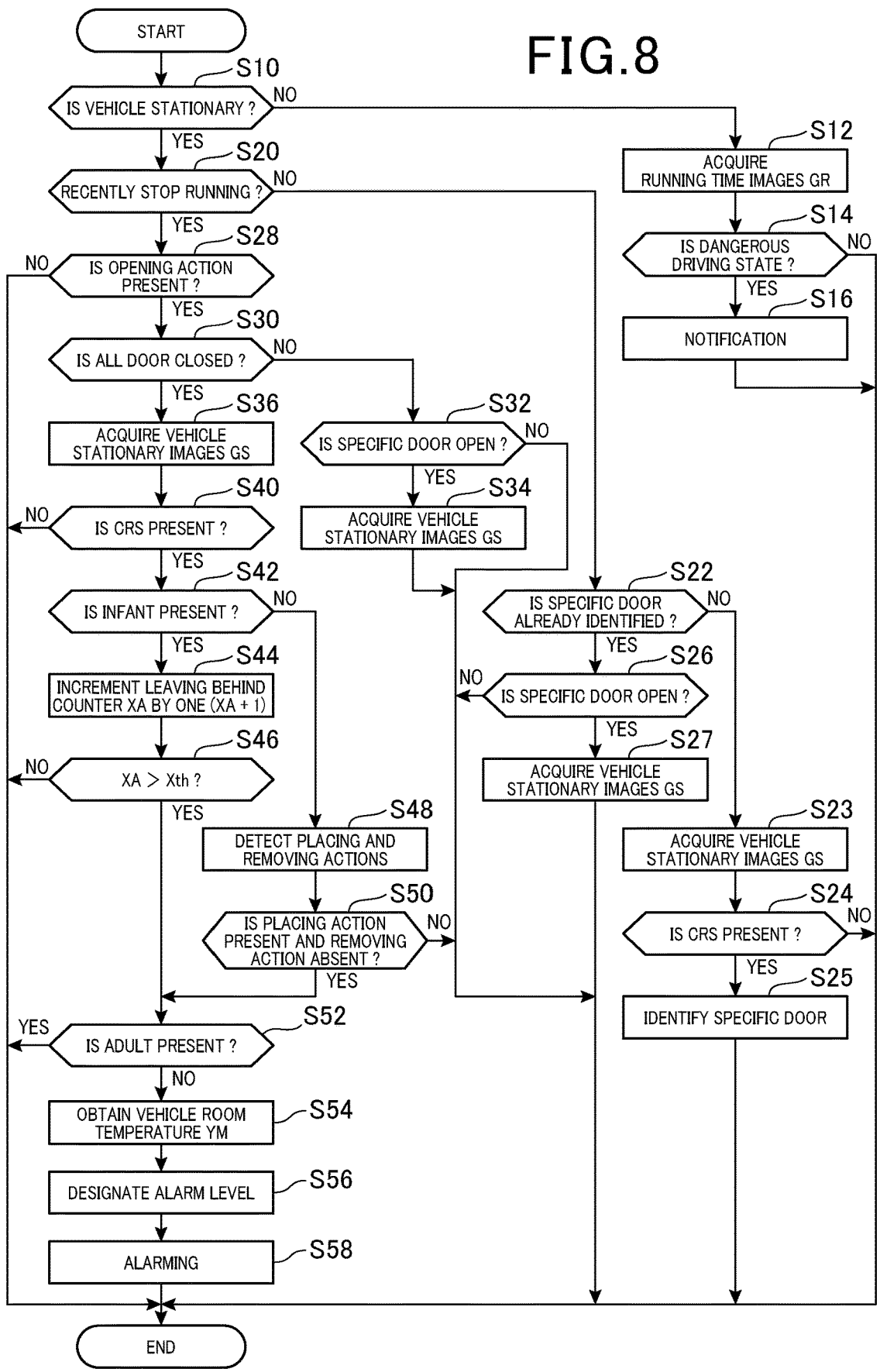
FIG. 8 is a flowchart illustrating an exemplary determination process performed in the first embodiment of the present disclosure.

Now, determination process for determining presence or absence of an infant left behind in the cabin will be herein below described with reference to a flowchart of FIG. 8. The determination process is repeatedly performed by the vehicle control system 40 per given period.

First, in step S10, it is determined whether the vehicle 10 is in a running stop condition (i.e., stationary). Here, the running stop condition represents a condition in which a vehicle speed VM obtained from the running status recognition unit 30 is about zero.

When the determination in step S10 is negative, the running time image acquirer 71 acquires a running time image GR in step S12. Subsequently, it is determined whether a driver is in a dangerous driving state by the dangerous driving state determiner 86 in step S14 based on the running time image GR acquired in step S12.

When the determination in step S14 is negative, the determination process is terminated. By contrast, when the determination in step S14 is positive, the notification process is performed in step S16 and the determination process is terminated.

By contrast, when the determination in step S10 is positive, it is then determined whether the vehicle 10 has recently stopped running in step S20. Such a state of stopping of running just before (hereinafter, simply referred to as a recently stopped running state) can be determined by using various existing detectors. For example, the recently stopped running state can be determined based on an output of the water temperature detector 24. Specifically, when a degree of engine temperature calculated based on a cooling water temperature obtained from the water temperature detector 24 is higher than a given degree of temperature, the recently stopped running state may be recognized.

By contrast, if the vehicle 10 has not recently stopped running, i.e., it is in a state before start running, determination in step S20 is negative. In such a situation, it is Subsequently determined whether the specific door 17 has been identified in step S22. When the determination in step S22 is negative, i.e., the specific door 17 has not yet specified, the vehicle stationary image acquirer 72 acquires a vehicle stationary image GS in step S23. Subsequently, in step S24, based on the vehicle stationary image GS acquired in step S23, it is determined whether the CRS 15 is present in the cabin. Such a process of step S23 is performed by the CRS presence determiner 81.

When the determination in step S24 is negative, the determination process is terminated. By contrast, when the determination in step S24 is positive, i.e., it is determined that the CRS 15 is present in the cabin, the specific door 17 closest to a seat with the CRS 15 mounted thereon is identified among the vehicle doors 16 and 17 in step S25 and the determination process is terminated.

By contrast, if the determination in step S22 is positive, i.e., the specific door 17 has been identified, it is determined by using the door detector 22 whether the specific door 17 is in an open state in step S26. When the determination in step S26 is negative, the determination process is terminated. By contrast, when the determination in step S26 is positive, the vehicle stationary image acquirer 72 acquires a vehicle stationary image GS in step S27 and the determination process is terminated.

Further, in step S20, if the vehicle 10 is in the recently stopped running state by contrast, determination in step S20 becomes positive. In such a situation, it is subsequently determined whether the vehicle doors 16 and 17 are opened after the vehicle 10 stops running in step S28.

Specifically, if a history of opening and closing information of the vehicle doors 16 and 17 obtained from the door detector 22 after the vehicle 10 stops running excludes information indicating an open state, determination in step S28 becomes negative. That is, in such a situation, since all of occupants including the driver are present in the cabin, and accordingly the infant is not left behind in the cabin, the determination process is terminated.

By contrast, if the history of opening and closing information of the vehicle doors 16 and 17 includes information indicating the open state of at least one of the vehicle doors 16 and 17, the determination in step S28 becomes positive. In such a situation, since an occupant has possibly exited while leaving an infant behind in the cabin, the process proceeds to step S30.

Specifically, in step S30, it is determined based on an output of the door detector 22 whether all of the vehicle doors 16 and 17 is in a closed state. When the determination in step S30 is negative, it is determined whether the specific door 17 is in an open state in step S32. When the determination in step S32 is negative, the determination process is terminated. By contrast, when the determination in step S32 is positive, a vehicle stationary image GS is acquired by the vehicle stationary image acquirer 72 in step S34, and the determination process is terminated. Hence, in this embodiment, a process of each of steps S26, S30 and S32 corresponds to a process performed by the opening and closing determiner.

By contrast, when the determination in step S30 is positive, a vehicle stationary image GS is acquired by the vehicle stationary image acquirer 72 in step S36. Subsequently, in step S40, it is determined based on the vehicle stationary image GS acquired in step S36 whether the CRS 15 is present in the cabin. The process of step S40 is performed by the CRS presence determiner 81. Accordingly, in this embodiment, the process performed in each of steps S12, S23, S27, S34 and S36 corresponds to a process performed by the image acquirer. Further, the process performed in each of steps S24 and S40 corresponds to a process performed by the seat presence determiner.

Further, when the determination in step S40 is negative, the determination process is terminated. By contrast, when the determination in step S40 is positive, i.e., it is determined that the CRS 15 is present in the cabin, it is then determined whether an infant is left behind in the CRS 15 in step S42. Here, the process of step S42 is performed by the first infant determiner 82.

Specifically, in step S42, it is determined whether the infant is present on the CRS 15. For example, a region in which the CRS 15 is detected is initially identified in the vehicle stationary image GS acquired in step S36. Then, an image analyzing process, such as an enlargement process, a sharpness enhancing process, etc., is applied to an image in the region, thereby determining whether the infant is present thereon.

Further, when the determination in step S42 is positive, a leaving behind counter XA is increment by one in step S44. The Left-behind counter XA is provided to suppress execution of the alarm process based on erroneous determination generated by the first infant determiner 82.

Figure 9:
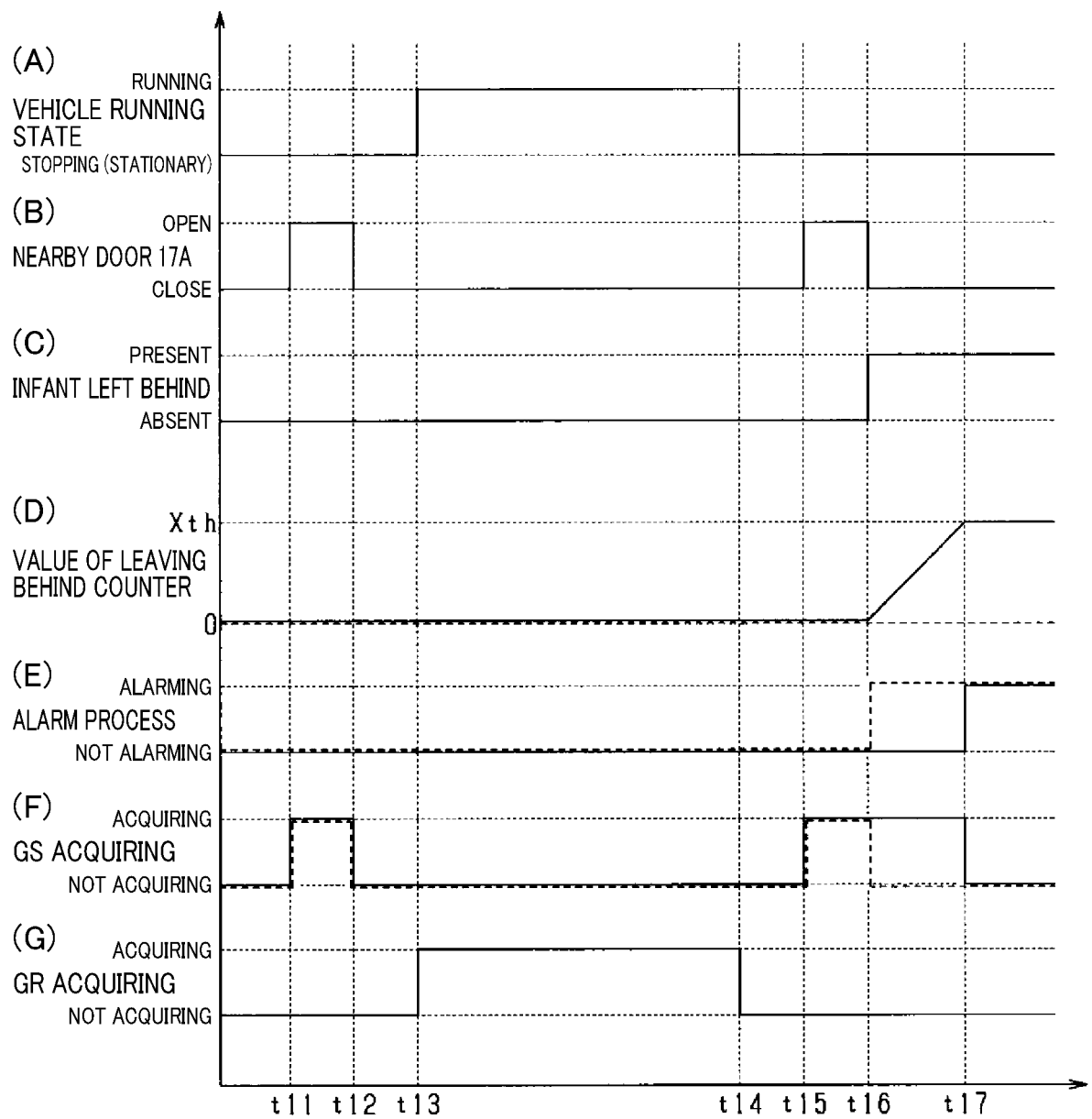
FIGS. 9(A) to 9(G) are graphs collectively forming a timing chart more specifically illustrating the determination process of FIG. 8 according to the first embodiment of the present disclosure.

Hence, it is then determined whether a value of the leaving behind counter XA is greater than a given value Xth (see FIG. 9(D)) in step S46. The given value Xth is a reference value designated in accordance with either a resolution of the vehicle stationary image GS or an image processing ability of the first infant determiner 82. Further, when the determination in step S46 is negative, the determination process is terminated. By contrast, when the determination in step S46 is positive, the process proceeds to step S52.

Further, when the determination in step S42 is negative by contrast, actions taken when the infant is placed on and removed from the CRS 15 are detected in step S48. In step S48, the actions taken when the infant placed on and removed from the CRS 15 is detected not based on the vehicle stationary image GS acquired in step S36 but the vehicle stationary image GS acquired during a door open period HP when the specific door 17 is open. A process of step S48 is performed by the placing and removing action detector 83. Hence, in this embodiment, the process performed in step S48 corresponds to a process performed by the action detection unit.

Specifically, an action taken when the infant is placed on the CRS 15 is detected based on the vehicle stationary images GS acquired in steps S23 and S27. More specifically, Among the vehicle stationary images GS acquired in steps S23 and S27, a first vehicle stationary image GS1 captured immediately after opening of the specific door 17 (see FIG. 7A) and a second vehicle stationary image GS2 captured just before closure of the specific door 17 (see FIG. 7B) are select. Then, placing of the infant on CRS 15 is detected (i.e., recognized) based on both the first vehicle stationary image GS1 and the second vehicle stationary image GS2.

Further, based on the vehicle stationary image GS acquired in step S34, an action of removing the infant from the CRS 15 is also detected. Specifically, among the vehicle stationary images GS acquired in step S34, a first vehicle stationary image GS1 captured immediately after opening of the specific door 17 (see FIG. 7B) and a second vehicle stationary image GS2 captured just before closure of the specific door 17 (see FIG. 7A) are selected. Then, removing of the infant from the CRS 15 is detected (recognized) based on both the first vehicle stationary image GS1 and the second vehicle stationary image GS2.

Subsequently, in step S50, it is determined based on such a detection result generated in step S48 whether the infant is left behind on the CRS 15. Here, a process of step S50 is performed by the second infant determiner 84.

More specifically, in step S50, it is determined that the infant is left behind on the CRS 15 when an action taken when the infant is placed on the CRS 15 is detected in step S48 and an action taken when the infant is removed from the CRS 15 is not detected. That is, when the infant placed on the CRS 15 before running of the vehicle is not removed from the CRS 15 after stop of running thereof, it is determined whether the infant is left behind on the CRS 15. Hence, in this embodiment, each of the processes performed in steps S42 and S50 corresponds to a process performed by the leaving behind determiner.

When determination in step S50 is negative, the determination process is terminated. By contrast, when the determination in step S50 is positive, the determination process proceeds to step S52.

Specifically, in step S52, it is determined whether an adult is present in the cabin based on the vehicle stationary image GS acquired in step S36. Such A process of step S52 is performed by the adult presence determiner 85. Hence, in this embodiment, the process of step S52 corresponds to a process performed by the adult presence determiner.

Further, when the determination in step S52 is negative, vehicle cabin room temperature YM is obtained via a temperature detector 23 in step S54. Subsequently, an alarm level is designated in step S56 based on the cabin room temperature YM obtained in step S54. Specifically, the alarm level is designated such that a risk (i.e., alarm) level increases as vehicle cabin room temperature YM increases. Hence, in this embodiment, the process of step S54 corresponds to a process performed by the temperature acquirer.

Subsequently, the alarm process is performed in step S58 by outputting an alarm instruction indicating the alarm level designated in step S56. The determination process is then terminated. Hence, in this embodiment, the process of step S58 corresponds to a process performed by the alarm control unit.

By contrast, when the determination in step S52 is positive, the determination process is terminated. That is, if it is determined that the adult is present in the cabin, even if it is determined that the infant is left behind in steps S42 and S50, the determination process is terminated without performing the alarm process.

Further, FIGS. 9(A) to 9(G) are graphs collectively forming a timing chart specifically illustrating a determination process performed when an infant is left behind in a cabin. Specifically, FIG. 9(A) illustrates a transition between a vehicle running condition and a running stop condition. FIG. 9(B) illustrates a transition between opening and closing conditions of a nearby door 17A among specific doors 17. FIG. 9(C) illustrates a transition between presence and absence of an infant left behind in a cabin.

Further, FIG. 9(D) illustrates a transition of a value of a leaving behind counter XA. FIG. 9(E) illustrates a transition between an alarm execution state in which an alarm process is performed and a no-alarm execution state in which an alarm process is not performed. FIG. 9(F) indicates a transition between an acquisition state in which a vehicle stationary image GS is acquired and a no-acquisition state in which a vehicle stationary image GS is not acquired. Further, FIG. 9(G) illustrates a transition between an acquisition state in which a running time image GR is acquired and a no-acquisition state in which a running time image GR is not acquired.

Here, FIGS. 9D to 9F illustrate transitions of various values by solid lines, respectively, when it is determined that an infant is left behind in the process performed in step S42. Also, FIGS. 9D to 9F illustrate transitions of various values by broken lines, respectively, when it is determined that an infant is left behind in the process performed in step S50.

Further, at a time t11, locks of the vehicle doors 16 and 17 are released by a driver during a running stop time and a specific door 17 and a nearby door 17A are then identified. Subsequently, the nearby door 17A changes from a closed state to an open state. After that, a vehicle stationary image GS starts being acquired before running. Then, at a time t12, when the nearby door 17A changes from the open state to a closed state, acquisition of the vehicle stationary image GS before running is terminated. Since an infant is placed on the CRS 15 by an adult in a door opening period HP between the time t11 and the time t12 in this embodiment, actions taken when the infant is placed on the CRS 15 are detected based on the vehicle stationary image GS before running.

Subsequently, at a time t13, when a vehicle 10 starts traveling and a vehicle speed VM becomes greater than zero, it is determined that the vehicle 10 is in a state of running. After that, a running time image GR starts being acquired and it is determined whether a driver is in a drive danger condition. After that, at a time t14, when the vehicle speed VM becomes zero, it is determined that the vehicle 10 is in a running stop condition and acquisition of the running time image GR is terminated.

Then, at a time t15, when the nearby door 17A changes from the closed state to an open state, a vehicle stationary image GS starts being acquired after the vehicle stops running. Here, at a time t16, even if the nearby door 17A changes from the open state to a closed state after the vehicle becomes stationary, the vehicle stationary image GS is continuously acquired. In this embodiment, in the door opening period HP from the time t15 to the time t16, an infant is not removed by an adult from the CRS 15. Hence, actions to be taken when the infant is removed from the CRS 15 are not detected, so that the infant is left behind in the cabin.

Specifically, when the nearby door 17A is closed at the time t16 and all of the vehicle doors 16 and 17 of the vehicle 10 is closed, it is determined that the infant is left behind in the cabin. Further, as shown by the respective solid lines in FIGS. 9D and 9E, when an infant is included in the vehicle stationary image GS acquired on or after the time t16, the leaving behind counter XA starts being incremented by one. In such a situation, at a time t17, when a value of the leaving behind counter XA becomes greater than the given value Xth, an alarm process is performed.

By contrast, if the infant is excluded from the vehicle stationary image GS acquired on or after the time t16, it is determined that actions taken when the infant is placed on the CRS 15 are performed and actions to be taken when the infant is removed from the CRS 15 are not performed. Hence, in such a situation, at the time t16 earlier than the time t17, the alarm process is performed.

Hence, as described heretofore, according to this embodiment, the blow described advantages can be obtained.

First, according to this embodiment, a vehicle stationary image GS as an image of a cabin is acquired by using an imaging device 21 in a running stop condition of a vehicle 10 and it is determined based on the vehicle stationary image GS whether an infant is left behind in the cabin. Hence, by using the vehicle stationary image GS in determining whether the infant is left behind, the infant included in the vehicle stationary image GS can be determined (i.e., identified), for example, by using either an image extraction process or a face recognition process. Accordingly, based on confirmation of the presence of the infant, whether the infant is left behind in the cabin can be determined. In such a situation, determination of whether the CRS 15 is included in the vehicle stationary image GS is considered to be easier than determination of whether the infant is included in the vehicle stationary image GS.

Further, when a CRS 15 is mounted in the cabin, an infant in the cabin is considered to be seated in the CRS 15. In such a situation, determination of whether the CRS 15 is included in the vehicle stationary image GS is considered to be easier than determination of whether the infant is included in the vehicle stationary image GS. In view of this, according to this embodiment, to determine whether an infant is left behind, it is initially determined whether the CRS 15 is present, and it is then determined whether the infant is present on the CRS 15. Hence, leaving the infant behind on the CRS 15 can be effectively determined. That is, when it is determined that the CRS 15 is present, for example, image processing is applied only to an area in the vicinity of the CRS 15 included in the vehicle stationary image GS and it is determined whether the infant is included therein.

Further, the CRS 15 is sometimes mounted backward, For example. Furthermore, a hood is sometimes attached to the CRS 15. In these situations, since a seating portion seated by an infant on the CRS 15 becomes a blind spot for the imaging device 21, the infant seated on the CRS 15 can sometimes be difficult to image.

In view of this, according to this embodiment, when it is determined whether an infant is left behind, actions taken when the infant is placed on and removed from the CRS 15 are detected based on a vehicle stationary image GS. Hence, since even if the infant seated on the CRS 15 is difficult to be imaged, leaving of the infant behind on the CRS 15 can be easily recognized when actions of placing the infant on the CRS 15 are detected, but actions of removing the infant from the CRS 15 are not detected thereafter.

For example, when an adult places an infant on and removes the infant from the CRS 15, the adult opens a specific door 17 closest to a seat on which the CRS 15 is mounted among the vehicle doors 16 and 17, and he or she places and removes the infant thereon and therefrom through the specific door 17. In view of this, by using the vehicle stationary image GS acquired in the door open period HP when the specific door 17 is open, actions of placing and removing the infant on and from the CRS 15 can be effectively detected.

More specifically, it is expected that an infant is placed and removed via a nearby door 17A among the specific doors 17, closest to the seat on which the CRS 15 is mounted. In view of this, by using the vehicle stationary image GS acquired during the door opening period HP in which the nearby door 17A is open, actions of placing and removing the infant can be effectively accurately detected.

More specifically, among vehicle stationary images GS acquired during the door opening period HP when the nearby door 17A is open, a first vehicle stationary image GS1 captured immediately after opening of the nearby door 17A and a second vehicle stationary image GS2 captured just before closure of the nearby door 17A are selected. Then, based on the first vehicle stationary image GS1 and the second vehicle stationary image GS2, actions of placing and removing the infant on and from the CRS 15 are detected. Hence, due to usage of the first and second vehicle stationary images GS1 and GS2, an intermediate action between actions imaged in the first vehicle stationary image GS1 and the second vehicle stationary image GS2 can be detected. Hence, intermediate actions taken when the infant is placed on and removed from the CRS 15 can be detected, respectively.

Further, according to this embodiment, a method of determining whether an infant is left behind based on a vehicle stationary image GS is composed of a first method determining whether the infant is included in the vehicle stationary image GS (hereinafter simply referred to as a first method). The method is also composed of a second method of detecting actions taken when the infant is placed on and removed from the vehicle stationary image GS (hereinafter simply referred to as a second method). That is, according to this embodiment, by using the first method, since multiple vehicle stationary images GS captured after an infant is actually left behind are used to determine if the infant is left behind, the determination can be accurate. Further, by using the second method, since multiple vehicle stationary images GS captured before an infant is actually left behind are used to determine if the infant is left behind, whether the infant is left behind can be shortly determined.

Further, according to this embodiment, a vehicle stationary image GS and a running time image GR are acquired by using the same imaging device 21 for determining whether an infant is left behind in a cabin and whether a driver is in a dangerous driving state, respectively. Hence, since two imaging devices 21 are not needed to respectively acquire these images GS and GR, and accordingly a vehicle control system 40 is not needed to control all of these imaging devices 21, a configuration of the vehicle control system 40 can be simplified.

Further, according to this embodiment, an alarm process is generally performed to avoid a danger as a danger avoidance process. However, when it is determined that the adult is present in the cabin, the alarm process is not performed. That is, when the adult is present in the cabin, since the adult generally avoids a danger to an infant, an unnecessary alarm process can be either omitted or reduced.

Further, according to this embodiment, multiple alarm levels are designated in an alarm process in accordance with vehicle cabin room temperature YM. Hence, for example, when the vehicle cabin room temperature YM (i.e., room temperature of the cabin) is relatively high, a higher alarm level is designated so that a danger to an infant left behind in the cabin can be highly likely avoided.

Now, a second embodiment will be herein below described with reference to FIGS. 10 and 11 mainly based on a difference from the first embodiment. Specifically, according to this embodiment, for the imaging device 21, a first imaging device 21A and a second imaging device 21B are employed as different from the first embodiment.

Figure 10:
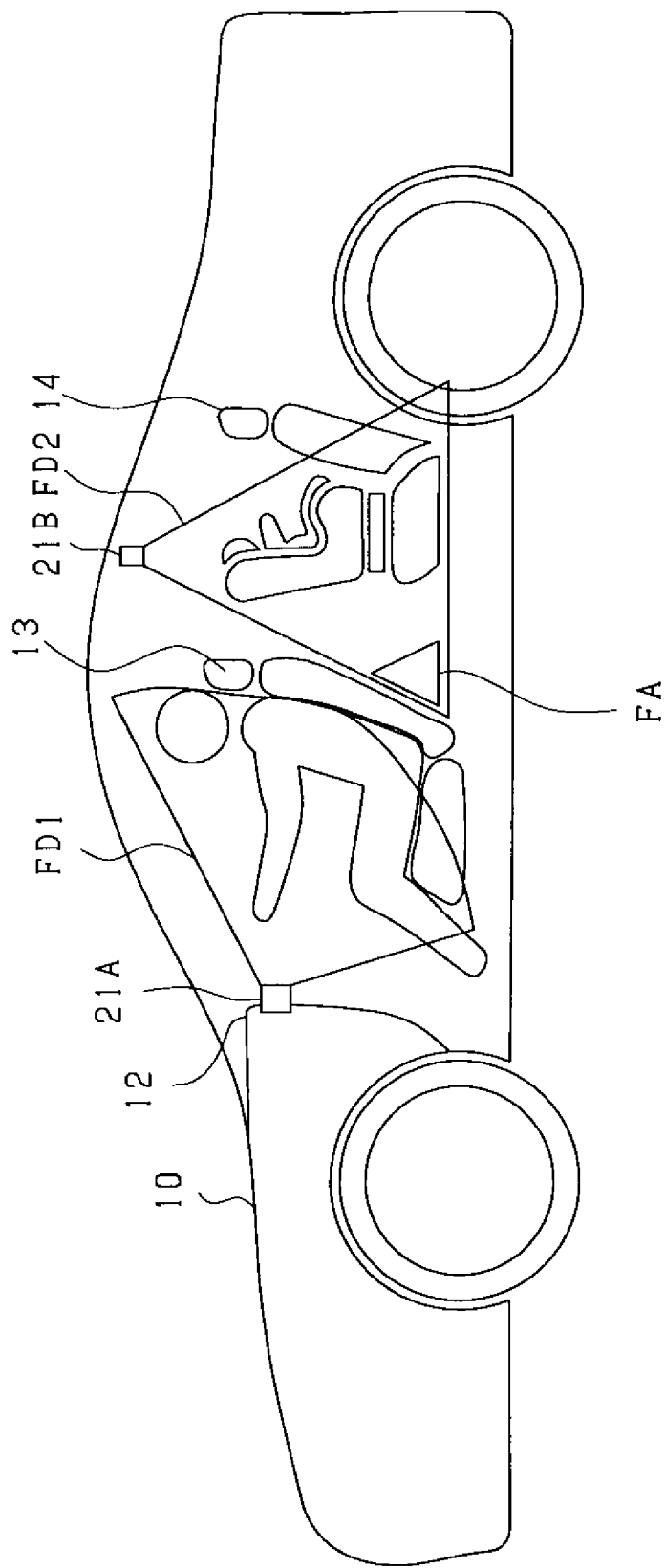
FIG. 10 is a diagram illustrating mounting locations on a vehicle, at which imaging devices are respectively mounted according to a second embodiment of the present disclosure.
Figure 11:
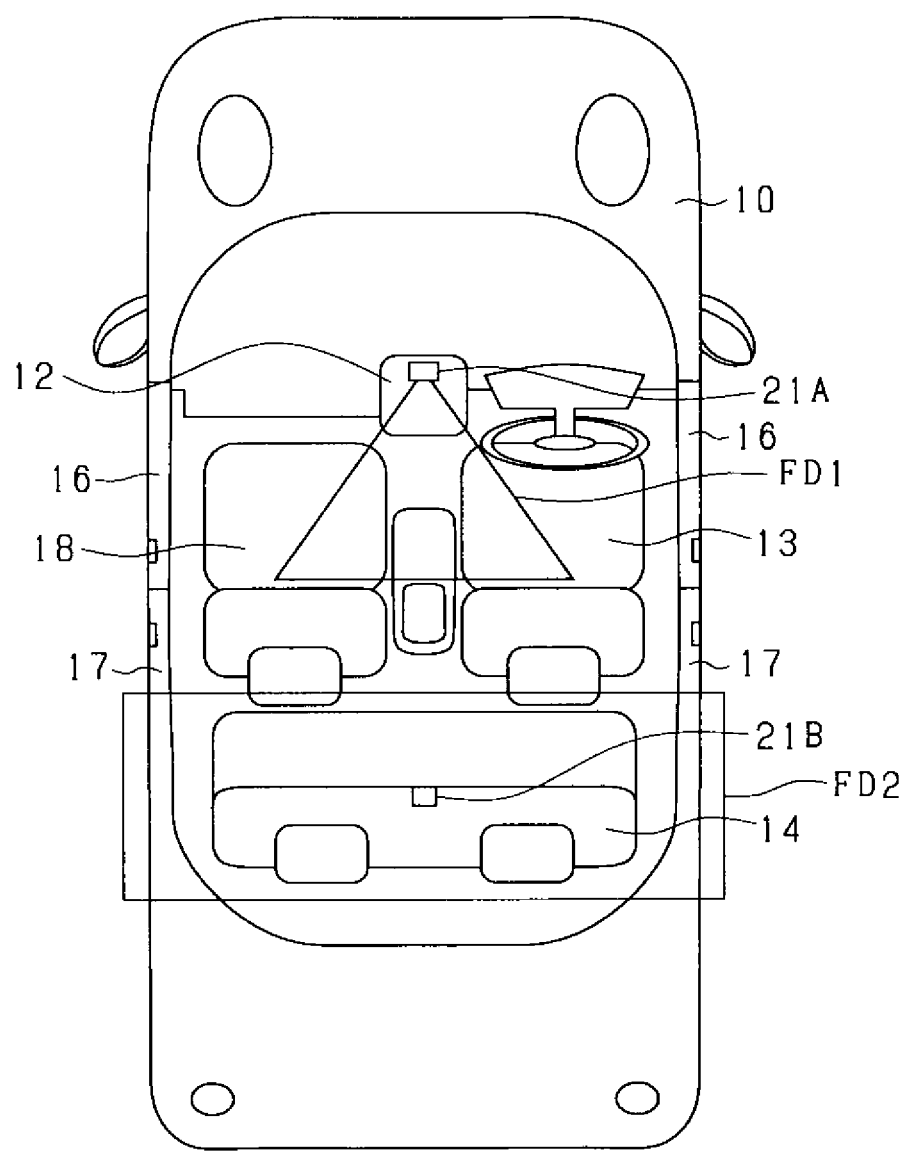
FIG. 11 is a diagram illustrating exemplary imaging ranges in which objects can be imaged by the imaging devices according to the second embodiment.

As illustrated in FIGS. 10 and 11, the first imaging device 21A is a front camera installed in the instrument panel 12, facing a driver's seat 13 and an assistant driver's seat 18. Hence, a first imaging range FD1 of the first imaging device 21A extends over the driver's seat 13 and the assistant driver's seat 18. By contrast, since the driver's seat 13 and the assistant driver's seat 18 interfere, the first imaging range FD1 of the first imaging device 21A excludes rear seats 14 and rear doors 17. Hence, with the first imaging device 21A, an infant seated on the CRS 15 mounted facing backward on the rear seat 14 cannot be imaged. In addition, actions of placing and removing the infant on and from the CRS 15 via a nearby door 17A cannot be imaged.

In particular, a relatively large blind spot FA occurs behind each of the driver's seat 13 and the assistant driver's seat 18, for example, in a foot space for the rear seats 14. Hence, when an infant who can get into a vehicle 10 by oneself gets off from the vehicle 10 and then gets into the vehicle 10 again and enters the blind spot FA, the infant cannot be imaged by the first imaging device 21A.

In view of this, the second imaging device 21B is employed in this embodiment in addition to the first imaging device 21A in the vehicle 10. Specifically, the second imaging device 21B is mounted behind the driver's seat 13 facing the rear seat 14 in the vehicle 10. More specifically, the second imaging device 21B is a rear camera attached to a ceiling portion above the rear seats 14 to image the rear seats 14. Hence, the rear seats 14 and the rear doors 17 enter a second imaging range FD2 of the second imaging device 21B. Hence, by using the second imaging device 21B, an infant seated on the CRS 15 mounted facing backward on the rear seat 14 can be imaged. Further, actions of placing an infant on and removing the infant from the CRS 15 via the nearby door 17A can be imaged.

Further, the second imaging range FD2 of the second imaging device 21B extends over the blind spot FA of the first imaging device 21A. Hence, by using the second imaging range FD2, leaving an infant behind in the blind spot FA can be recognized.

Here, the second imaging range FD2 of the second imaging device 21B excludes the driver's seat 13 and the assistant driver's seat 18. Hence, an infant seated on a CRS 15 mounted on the assistant driver's seat 18 cannot be imaged by the second imaging device 21B. In view of this, according to this embodiment, the vehicle stationary image acquirer 72 acquires vehicle stationary images GS from the first imaging device 21A and the second imaging device 21B during stop of running of the vehicle 10. Specifically, by using both of the first imaging device 21A and the second imaging device 21B, blind spots of the imaging devices 21A and 21B in the cabin can be reduced.

As described heretofore, according to this embodiment, the below described advantages can be obtained.

First, if the imaging device 21 only includes the front camera, blind spots occur in both the driver's seat 13 and the assistant driver's seat 18. In particular, since a relatively large blind spot FA occurs in the foot space before the rear seats 14, if the infant enters the blind spot FA, leaving the infant behind in the blind spot FA cannot be recognized.

In view of this, according to this embodiment, in addition to the first imaging device 21A acting as a front camera, the second imaging device 21B is employed and mounted on the ceiling portion above the rear seats 14 to act as a rear camera. Hence, a foot space for the rear seats 14 can be imaged by the second imaging device 21B. That is, by using the first imaging device 21A and the second imaging device 21B in cooperation with each other, the number of blind spots of the imaging device 21A and 21B can be reduced, thereby accurately enabling determination of whether the infant is left behind.

Now, various modifications of the above-described embodiments are herein below described. that is, the present invention is not limited to the above-described embodiments and may include the blow described modifications.

Firstly, whether the vehicle 10 stops running can be determined based on a switch on or off condition of an IG switch acting as a starting switch starting the vehicle 10 instead of the vehicle speed VM.

Secondly, As the number of imaging devices 21, it is not limited to one or two, and three or more can be employed.

Thirdly, the number of vehicle stationary images GS captured per determination process can be either one or more. That is, when the number of vehicle stationary images GS is one, a time required for a single determination process can be shortened, thereby quickly completing determination of whether an infant is left behind in the vehicle. Further, when the number of vehicle stationary images GS are two or more, determination of whether an infant is left behind can be accurate.

Further, the imaging device 21 is not limited to that mounted on the vehicle. For example, a portable information terminal can be used as the imaging device 21. In such a situation, the vehicle control system 40 acquires an image from the portable information terminal, for example, via wireless communication.

Further, a pair of vehicle stationary images GS selected from the vehicle stationary images GS acquired during the door open period HP of the specific door 17 in order to detect actions to place and remove the infant on and from the CRS 15 are not limited to the above-described first vehicle stationary image GS1 and the second vehicle stationary image GS2. That is, a third vehicle stationary image GS3 is captured when an adult approaches the CRS 15 most and can be selected as a vehicle stationary image GS, For example.

Further, when determination of whether an adult is present in the cabin is positive, it can be further determined whether the adult is dozing. That is, If the adult is dozing, the alarm process can be performed. In such a situation, adult dozing determination can be performed substantially in the same manner as determination of the dangerous driving state of the driver.

Further, a designation parameter designating the alarm level is not limited to the above-described vehicle cabin room temperature YM. For example, a switch on-off condition of the IG switch can be the parameter in order to designate the alarm level in accordance with an operation condition of an air conditioner installed in the vehicle 10. Otherwise, a locking condition of each of the vehicle doors 16 and 17, an opening and closing condition of each of windows attached to the vehicle doors 16 and 17 and a temperature difference between vehicle cabin room temperature YM and ambient temperature can be designation parameters.

Further, in the above-described embodiment, as the specific door 17 used (i.e., opened) when the infant is placed on and removed from the CRS 15, a far side door not closest to a seat on which the CRS 15 is mounted can be used in place of the nearby door 17A. Further, both of the nearby door 17A and the far side door can be used.

Further, in the above-described embodiment, even when determination in step S40 is negative (i.e., the CRS 15 is absent in the vehicle), whether the infant is left behind can be determined. In such a situation, since the CRS 15 is not detected, image analysis is entirely applied to the vehicle stationary image GS acquired in step S36. That is, a region of the vehicle stationary image GS acquired in step S36 can be changed to receive image analysis based on a result of determination in step S40.

Further, in the above-described embodiment, during running of the vehicle, an action taken when the infant is placed on the CRS 15 can be detected.

Further, different from the second embodiment, the second imaging device 21B can capture a running time image GR during running of the vehicle. Then, a fastening condition of a seat belt fastening an infant to the rear seat 14 can be determined based on the running time image GR. Further, after stop of running of the vehicle 10, an occupant getting off a vehicle can be supported based on a running time image GR captured by the second imaging device 21B.

Numerous additional modifications and variations of the present disclosure are possible in light of the above teachings. It is therefore to be understood that within the scope of the appended claims, the present disclosure may be performed otherwise than as specifically described herein. For example, the present disclosure is not limited to the above-described vehicle mounted system and may be altered as appropriate. Further, the present disclosure is not limited to the above-described vehicle control system and may be altered as appropriate. Further, the present disclosure is not limited to the above-described vehicle control method and may be altered as appropriate.

What is claimed is:

1. A vehicle mounted system comprising:
an imaging device configured to capture one or more vehicle stationary images indicating an interior of a cabin of a vehicle when the vehicle stops running;
a vehicle control system configured to monitor an infant possibly left behind in the cabin of the vehicle and perform a danger avoidance process of either avoiding or reducing a danger to the infant based on a monitoring result, the vehicle control system including:
an image acquirer configured to acquire the one or more vehicle stationary images from the imaging device;
a leaving behind determiner configured to determine whether the infant is left behind in the cabin based on the one or more vehicle stationary images;
a seat presence determiner configured to determine whether a child seat is present in the cabin based on the one or more vehicle stationary images; and
an action detection device configured to detect actions taken by a driver or an occupant when an infant is placed on and removed from the child seat based on the vehicle stationary images for a state in which it is determined by the seat presence determiner that the child seat is present in the cabin; and
a door opening and closing condition detector configured to detect a door opening and closing condition of each of front doors and rear doors of the vehicle,
wherein for a state in which it is determined by the seat presence determiner that the child seat is present in the cabin, the leaving behind determiner determines whether the infant is left behind on the child seat based on an image indicating the child seat included in the one or more vehicle stationary images,
wherein for a state in which an action of placing the infant on the child seat is detected but an action of removing the infant from the child seat is not detected subsequently by the action detection device, the leaving behind determiner determines that the infant is left behind on the child seat,
wherein the action detection device detects opening and closing conditions of a specific door closest to a seat on which the child seat is mounted among the front doors and the rear doors based on the door opening and closing condition detected by the door opening and closing condition detector,
the action detection device detecting the actions taken by the driver or the occupant when the infant is placed on and removed from the child seat during a door opening period from when the specific door closest to the seat is open to when the specific door is closed,
wherein the one or more vehicle stationary images include a first vehicle stationary image and a second vehicle stationary image, the first vehicle stationary image being captured immediately after the specific door is open, the second vehicle stationary image being captured immediately before the specific door is closed, and
wherein the action detection device detects the actions taken by the driver or the occupant when the infant is placed on and removed from the child seat based on the first vehicle stationary image and the second vehicle stationary image.

2. The vehicle mounted system as claimed in claim 1, wherein the imaging device captures a running time image during running of the vehicle and the image acquirer acquires the running time image from the imaging device, wherein it is determined based on the running time image whether a driver is in a dangerous driving state.

3. The vehicle mounted system as claimed in claim 1, wherein the imaging device includes:
a front camera configured to image a driving condition of a driver, and
a rear camera configured to image rear seats, the rear camera mounted on the vehicle behind a driver's seat,
wherein the image acquirer acquires images captured by the front camera and the rear camera as the one or more vehicle stationary images.

4. A vehicle mounted system comprising:
an imaging device configured to capture one or more vehicle stationary images indicating an interior of a cabin of a vehicle when the vehicle stops running;
a vehicle control system configured to monitor an infant possibly left behind in the cabin of the vehicle and perform a danger avoidance process of either avoiding or reducing a danger to the infant based on a monitoring result, the vehicle control system including:
an image acquirer configured to acquire the one or more vehicle stationary images from the imaging device, and
a leaving behind determiner configured to determine whether the infant is left behind in the cabin based on the one or more vehicle stationary images;
an alarm control unit configured to perform an alarm process as a danger avoidance process when it is determined by the leaving behind determiner that the infant is left behind; and
an adult presence determiner configured to determine whether an adult is present in the cabin based on the one or more vehicle stationary images,
wherein for a state in which it is determined by the adult presence determiner that the adult is present, the alarm control unit does not perform the alarm process even for a state in which it is determined by the leaving behind determiner that the infant is left behind.

5. The vehicle mounted system as claimed in claim 4, further comprising a temperature acquirer configured to acquire cabin room temperature,
wherein the alarm control unit is enabled to alarm at multiple levels and designates an alarm level in accordance with the cabin room temperature acquired by the temperature acquirer.

6. A vehicle control system for monitoring an infant possibly left behind in a cabin of a vehicle and performing a danger avoidance process of either avoiding or reducing a danger to the infant based on a monitoring result, the vehicle control system comprising:
an image acquirer configured to acquire one or more vehicle stationary images indicating an interior of a cabin from an imaging device;
a leaving behind determiner configured to determine whether the infant is left behind in the cabin based on the one or more vehicle stationary images;
a seat presence determiner configured to determine whether a child seat is present in the cabin based on the one or more vehicle stationary images; and
an action detection device configured to detect actions taken by a driver or an occupant when an infant is placed on and removed from the child seat based on the one or more vehicle stationary images if it is determined by the seat presence determiner that the child seat is present in the cabin,
wherein for a state in which it is determined by the seat presence determiner that the child seat is present in the cabin, the leaving behind determiner determines whether the infant is left behind on the child seat based on an image indicating the child seat included in the one or more vehicle stationary images, wherein for a state in which an action of placing the infant on the child seat is detected but an action of removing the infant from the child seat is not detected subsequently by the action detection device, the leaving behind determiner determines that the infant is left behind on the child seat, wherein the one or more vehicle stationary images include a first vehicle stationary image and a second vehicle stationary image, the first vehicle stationary image being captured immediately after a specific door is open, the second vehicle stationary image being captured immediately before the specific door is closed, and wherein the action detection device detects the actions taken by the driver or the occupant when the infant is placed on and removed from the child seat based on the first vehicle stationary image and the second vehicle stationary image.

7. A method of monitoring an infant possibly left behind in a cabin of a vehicle, comprising the steps of:

capturing vehicle stationary images of an interior of the cabin;

acquiring one or more vehicle stationary images, the one or more vehicle stationary images include a first vehicle stationary image and a second vehicle stationary image, the first vehicle stationary image being captured immediately after a specific door is open, the second vehicle stationary image being captured immediately before the specific door is closed;

determining whether a child seat is present in the cabin based on the one or more vehicle stationary images;

detecting each action taken by a driver or an occupant when an infant is placed on and removed from the child seat based on the first vehicle stationary image and the second vehicle stationary image for a state in which it is determined that the child seat is present in the cabin;

determining whether the infant is left behind in the cabin based on the one or more vehicle stationary images;

determining that the infant is left behind on the child seat for a state in which an action of placing the infant on the child seat is detected but an action of removing the infant from the child seat is not detected subsequently; and performing a danger avoidance process of either avoiding or reducing a danger to the infant based on the determination of whether the infant is left behind in the cabin.

* * * * *